Feb. 17, 1931. W. M. WHITE 1,792,719
THRUST BEARING
Filed May 23, 1921
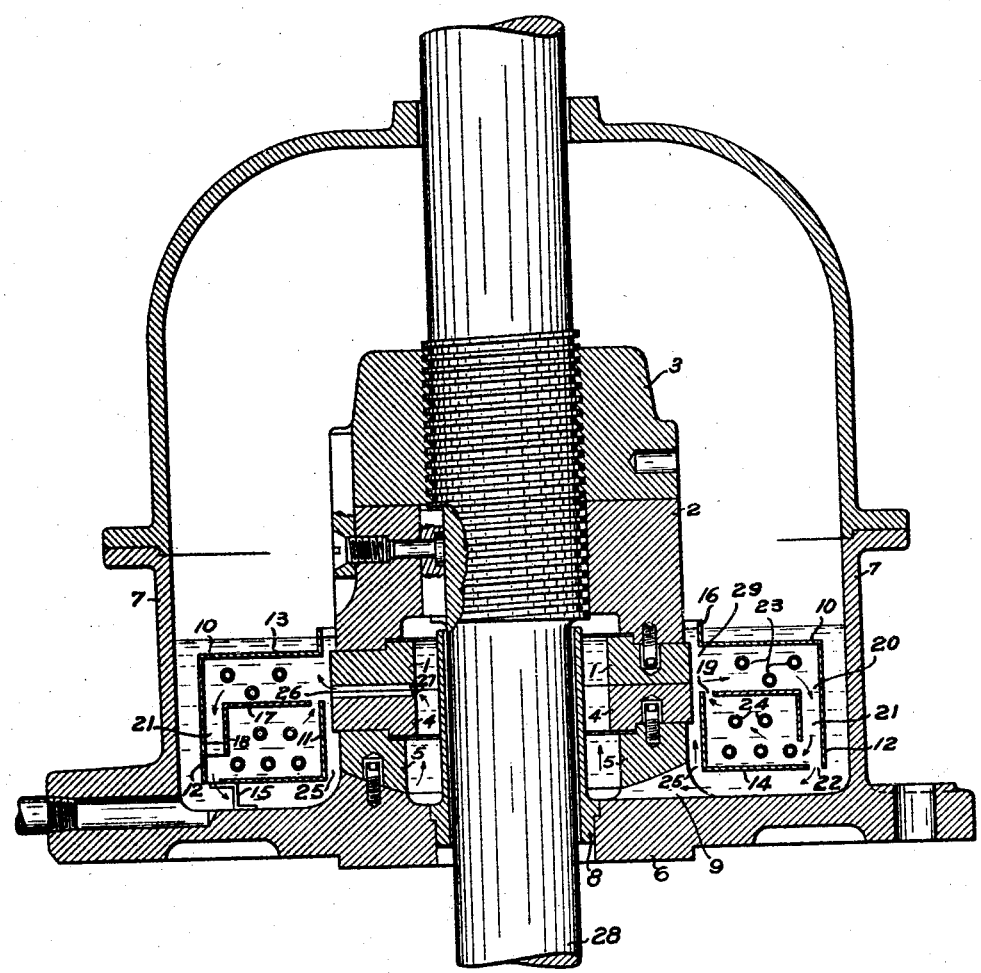

Patented Feb. 17, 1931

1,792,719

UNITED STATES PATENT OFFICE

WILLIAM MONROE WHITE, OF MILWAUKEE, WISCONSIN

THRUST BEARING

Application filed May 23, 1921. Serial No. 471,570.

This invention relates to thrust bearings and methods of cooling the same, and is particularly applicable to such bearings in which a body of oil is used to cool the same, said body of oil being in turn cooled by means disposed in the oil.

One of the objects of the invention is the provision of an efficient thrust bearing of the type hereinbefore noted. Another object is the provision of an efficient cooling system for bearings of this type and more specifically the provision of a cooling system in which oil is caused to circulate more than once by or through a cooling means before re-entering the wearing parts of the bearing. Other objects will appear hereinafter as the description of the invention proceeds.

The novel features of the invention will appear from this specification and the accompanying drawing forming a part thereof and disclosing one embodiment of said invention and all these novel features are intended to be pointed out in the claims.

The single figure of the drawing illustrates a vertical sectional view of a thrust bearing embodying the features of the invention.

The thrust bearing shown in the drawing comprises a thrust ring 1 supporting a collar 2 which surrounds the shaft 28. The collar 2 in turn supports the nut 3 threaded on the shaft 28. The thrust ring 1 is adapted to ride on and be supported by any desired number of bearing shoes 4 which are suitably mounted on a ring 5. The ring 5 is here shown as separate from and supported by the bearing support 6 which is provided with a wall 7 forming an oil well in conjunction with a sleeve 8 surrounding and spaced from the shaft 28 and fitted into a central opening in the bearing support 6.

The support 6 is here shown as provided with an oil-passage 9 whereby the annular space between the ring 5 and the sleeve 8 is put in communication with the main oil well.

Disposed in the main body of oil is an annular box-like baffle 10 which is here shown as comprising an inner wall 11 an outer wall 12 and top and bottom walls 13, 14 respectively. This annular baffle may be supported in any suitable manner in the desired relation with respect to the bearing, as by supports 15, which supports if placed as shown, are preferably discontinuous so as to permit of the free flow of oil, as will appear hereinafter. The top wall of the annular baffle is provided with a transverse vertical portion 16 which preferably rises above the level of the oil. The annular baffle is here shown as provided with an annular opening 29 so disposed as to be substantially in the general plane of a rotating portion of the bearing, as the thrust ring 1. The annular baffle is furthermore made of such inner diameter that an oil-passage 25 will be provided between the inner wall thereof and the outer surface of the bearing. The bottom wall of the annular baffle is also preferably spaced from the bottom of the main oil well so as to form an oil passage.

Disposed within the annular baffle 10 is a plane baffle 17 which is preferably so placed as to divide the annular baffle into an upper and lower compartment. The baffle 17 is here shown as provided at its radially outer end with a transverse downwardly extending portion 18. The baffle 17 has its inner end spaced from the inner wall 11 to form an opening 19 through which oil may pass out from the lower compartment. The outer end of the baffle 17 is spaced from the outer wall 12 to form an opening 20 through which oil may pass from the upper compartment into the passage 21, formed by the downwardly extending portion 18 and wall 12, into the lower compartment. The annular baffle is also provided, in its bottom wall 14, with an opening or openings 22 the purpose of which will hereinafter appear.

Cooling coils or pipes 23 and 24 are disposed in the upper and lower compartments respectively of the annular baffle. The cooling coils or pipes 23 are preferably of such number and position that the radially innermost ones will be so disposed as to leave an annular body of oil in the general plane of the thrust rings.

In the thrust bearing shown, one or more oil passages 26 are formed by channels 27 in either the thrust ring or the bearing shoes or both depending upon the particular type of bearing. In any event, in any type of thrust bearing, provision is made for the passage of oil from the radially inner side of the wearing parts through and between said parts to the radially outer side of said parts.

The operations of the bearing and its cooling system are as follows:—

As the thrust ring is rotated it will cause whirling of the annular body of oil extending from it through the opening 29 into the annular baffle. By reason of centrifugal force a pressure will be created in this whirling body of oil tending to drive the oil past the pipes 23 down into the passage 21 past the pipes 24 and out of the opening 19. This action will be assisted by the fact that the whirling body of oil will naturally tend to draw oil into it at its radially inner side, that is, through the opening 19 and the passage 25. The result of the foregoing action is that hot oil coming from the wearing parts of the bearing is caused to pass given cooling coils and then re-pass the same cooling coils one or more times before again going into the wearing parts. The coolest of the oil in the lower compartment of the annular baffle will pass out into the main oil well through the opening or openings 22. This body of cool oil may pass through the passage 9 into the body of oil in the radially inner part of the bearing from thence into the wearing parts and through these out again into the opening 29. Another portion of the oil which passes out of the opening 22 is drawn up by the suction action of the whirling body of oil through the passage 25, thus efficiently cooling the outer surface of the bearing.

It will be noted that in general hot oil coming from the wearing parts of the bearing is caused to circulate in a closed loop before again going into the wearing parts of the bearing. The entire body of oil which is caused to pass and re-pass the cooling coils may be regarded as approximating a vortex in form, oil being fed into this vortex along one line and taken out along another line or points. The number of times that any given portion of the oil circulates in a closed loop or in the vortex may depend upon a number of factors, one of which is its relative temperature and specific gravity with respect to oil outside of the annular baffle. It is for this reason that only the coolest oil passes out of the bottom of said baffle.

It should be understood that it is not desired to limit the invention claimed to the exact details of construction herein shown and described, for obvious modifications will occur to a person skilled in the art.

It is claimed and desired to secure by Letters Patent:

1. The combination of a thrust bearing, a body of oil surrounding said bearing, an annular box-like baffle surrounding said bearing and disposed in said oil, said annular baffle having an opening disposed near a rotating portion of said bearing, means disposed in said annular baffle whereby the oil is caused to have a circulating component in a plane transverse thereto, means for cooling the oil in said annular baffle, and means for permitting the exit of oil from said annular baffle.

2. In a thrust bearing of the type having a thrust ring and cooperating shoes, a body of oil surrounding said bearing, an annular box-like baffle surrounding said bearing and disposed in said oil, said annular baffle having an opening disposed near the outer periphery of said thrust ring and an opening in the bottom wall thereof, means for dividing said annular baffle into an upper and lower compartment, means for permitting the passage of oil as between said compartments near the outer and inner peripheries thereof respectively, and means for cooling the oil disposed in said annular baffle.

3. In a thrust bearing of the type having a thrust ring and cooperating shoes, a body of oil surrounding said bearing, an annular box-like baffle surrounding said bearing and disposed in said oil, said annular baffle having an opening disposed near the outer periphery of said thrust ring and an opening in the bottom wall thereof, a substantiallly horizontal baffle plate in said annular baffle and separating the same into an upper and lower compartment, said baffle being spaced from the inner and outer walls of said annular baffle, and cooling coils disposed within said annular baffle.

4. In a bearing, in combination with relatively rotatable bearing members, an oil well for supplying the bearing surfaces of said members with oil, a cooling coil for said oil, and a housing for said coil having an inlet contiguous to the periphery of said rotatable bearing member.

5. In a bearing, in combination with relatively rotatable bearing members, an oil well for supplying the bearing surfaces of said members with oil, a cooling coil for said oil, and a housing for said coil having an inlet contiguous to the periphery of said rotatable bearing member and serving to direct the flow of oil about said coil.

6. In a bearing, in combination with relatively rotatable bearing members, an oil well for supplying the bearing surfaces of said members with oil, a cooling coil for said oil, and a housing for said coil having an inlet contiguous to the periphery of said rotatable bearing member, said housing being spaced from the periphery of the bearing members to provide a passage through which oil will flow to mingle with the oil flowing from the bearing surfaces to said inlet.

7. In a bearing, in combinaation with relatively rotatable bearing members, an oil well for supplying the bearing surfaces of said members with oil, a cooling coil for said oil, and a housing for said coil having an inlet contiguous to and in substantial alignment with the periphery of said rotatable bearing member.

8. In a bearing, in combination with relatively rotatable bearing members, an oil well for supplying the bearing surfaces of said members with oil, a cooling coil in said well surrounding said bearing members, a wall within said coil spaced from the periphery of the bearing members to provide a passage for the flow of oil, said wall having its upper end at substantiallly the level of said bearing surfaces, and a wall above said coil, providing with said first-named wall an oil inlet to said coil contiguous to the periphery of said rotatable bearing member.

9. In a bearing, in combination with relatively rotatable bearing members, an oil well for supplying the bearing surfaces of said members with oil, a cooling coil for said oil, a housing for said coil having its inner wall spaced from the periphery of the bearing members to provide a passage for the upward flow of oil outside of said bearing members, said housing having an inlet in substantial alignment with and contiguous to the periphery of said rotatable bearing member, and a passage for the flow of oil to the inner side of said bearing surfaces.

10. In a bearing, in combination with relatively rotatable bearing members, a bearing housing containing a body of oil, a cooling coil, a housing for said cooling coil having an inlet contiguous to the periphery of the rotatable bearing member through which oil is forced to said coil by the movement of the rotatable bearing member, and a passage through which oil returns to said bearing surfaces.

11. In a bearing, in combination with relatively rotatable bearing members, an oil well for supplying the bearing surfaces of said members with oil, a cooling coil in said well surrounding said bearing surfaces and spaced therefrom, and means housing said coil and having an opening on its inner side contiguous to said rotatable bearing member through which oil is circulated into heat interchanging relation with said coil by the movement of the rotatable bearng member.

12. A bearing including an oil well, relatively rotatable means having cooperating bearing surfaces, disposed in said oil well whereby the oil is whirled by said rotatable means and thrown outwardly, a baffle spaced from said relatively rotatable means and having its upper end at substantially the level of said bearing surfaces to form a passage through which oil will be drawn from the lower part of said well into the low pressure zone near said whirling portion, the radial width of said passage at said zone being not greater than the width of the peripheral surface of the rotatable means which is active in producing said whirling and outward movement.

13. In a bearing, the combination with bearing members operable in a body of oil and having juxtaposed horizontal bearing surfaces, one of said bearing members being rotatable and having a free smooth peripheral surface in contact with the surrounding oil, of a cooling coil disposed in said body of oil radially outside of said bearing members, and a wall disposed radially within said coil and forming between said wall and the relatively stationary bearing members an inlet passage through which oil may be drawn from the lower part of said body of oil, the effective area of said inlet passage at the upper end of said wall being within the limits represented by the range between an area less than and not substantially greater than the area of said free peripheral surface of said rotatable member.

14. In a bearing, the combination with bearing members operable in a body of oil and having juxtaposed horizontal bearing surfaces, one of said bearing members being rotatable and having a free smooth peripheral surface in contact with the surrounding oil, of a cooling coil disposed in said body of oil radially outside of said bearing members, and a wall disposed radially within said coil and forming between said wall and the relatively stationary bearing members an inlet passage through which oil may be drawn from the lower part of said body of oil, the effective area of said inlet passage at the upper end of said wall being less than the area of said free peripheral surface of said rotatable member.

15. In a bearing, the combination with bearing members operable in a body of oil and having juxtaposed horizontal bearing surfaces, one of said bearing members being rotatable and having a cylidrical free smooth peripheral surface in contact with the surrounding oil, of a cooling coil disposed in said body of oil radially outside of said bearing members, and a wall disposed radially within said coil and forming between said wall and the relatively stationary bearing members an inlet passage through which oil may be drawn from the lower part of said body of oil, the effective area of said inlet passage at the upper end of said wall being within the limits represented by the range between an area less than and not substantially greater than the area of said free peripheral surface of said rotatable member.

16. In a bearing, the combination with bearing members operable in a body of oil and having juxtaposed horizontal bearing surfaces, one of said bearing members being rotatable and having a cylindrical free smooth peripheral surface in contact with the surrounding oil, of a cooling coil disposed in said body of oil radially outside of said bearing members, and a wall disposed radially within said coil and forming between said wall and the relatively stationary bearing members an inlet passage through which oil may be drawn from the lower part of said body of oil, the effective area of said inlet passage at the upper end of said wall being less than the area of said free peripheral surface of said rotatable member.

17. In a bearing, the combination with bearing members operable in a body of oil and having juxtaposed horizontal bearing surfaces, one of said bearing members being rotatable and having a free smooth peripheral surface in contact with the surrounding oil, of a cooling coil disposed in said body of oil radially outside of said bearing members, and a wall disposed radially within said coil and forming between said wall and the relatively stationary bearing members an inlet passage through which oil may be drawn from the lower part of said body of oil, the upper end of said wall being approximately at the level of said horizontal bearing surfaces, the effective area of said inlet passage at the upper end of said wall being within the limits represented by the range between an area less than and not substantially greater than the area of said free peripheral surface of said rotatable member.

18. In a bearing, the combination with bearing members operable in a body of oil and having juxtaposed horizontal bearing surfaces, one of said bearing members being rotatable and having a free smooth peripheral surface in contact with the surrounding oil, of a cooling coil disposed in said body of oil radially outside of said bearing members, and a wall disposed radially within said coil and forming between said wall and the relatively stationary bearing members an inlet passage through which oil may be drawn from the lower part of said body of oil, the upper end of said wall being approximately at the level of said horizontal bearing surfaces, the effective area of said inlet passage at the upper end of said wall being less than the area of said free peripheral surface of said rotatable member.

19. In a bearing, the combination with bearing members operable in a body of oil and having juxtaposed horizontal bearing surfaces, one of said bearing members being adapted to act as a rotatable impeller for oil surrounding it, of a cooling coil disposed in said body of oil radially outside of said bearing members, and a wall disposed radially within said coil and forming between said wall and the relatively stationary bearing members an inlet passage through which oil may be drawn from the lower part of said body of oil, the upper end of said wall being approximately at the level of said horizontal bearing surfaces, all points on the impelling surfaces being at a greater distance from the upper end of said wall than the least distance between the outer edge of said horizontal bearing surfaces and the inner periphery of said inlet passage at the level of the upper end of said wall.

20. In a vertical bearing disposed in an oil well, said bearing comprising a relatively stationary bearing structure, a wall surrounding and spaced from said structure and forming with the outer peripheral surface of said structure an oil passage, the peripheral surface of said structure forming a continuous inner wall for said passage extending from a predetermined lower level up to the level of the upper end of said first named wall and having a predetermined number of peripherally extending discontinuities which extend axially upward from the level of the upper end of said first named wall, said structure having a horizontal discontinuous bearing surface the discontinuities of which form with the discontinuities of said pheripheral surface a predetermined number of oil exits at the periphery of said structure, a rotatable bearing structure having a horizontal bearing surface cooperable with the discontinuous bearing surface of said relatively stationary bearing structure and having a peripheral impelling portion in contact with the surrounding oil, and cooling means disposed in said well radially outside of said first named wall.

21. In a vertical bearing disposed in an oil well, said bearing comprising a relatively stationary bearing structure, a wall surrounding and spaced from said structure and forming with the outer peripheral surface of said structure an oil passage, the peripheral surface of said structure forming a continuous inner wall for said passage extending from a predetermined lower level up to the level of the upper end of said first named wall and having a predetermined number of peripherally extending discontinuities which extend axially upward from the level of the upper end of said first named wall, said structure having a horizontal discontinuous bearing surface the discontinuities of which form with the discontinuities of said peripheral surface a predetermined number of oil exits at the periphery of said structure, a rotatable bearing structure having a horizontal bearing surface cooperable with the discontinuous bearing surface of said relatively stationary bearing structure and having a peripheral impelling portion in contact with the surrounding oil, the effective axial width of said peripheral impelling surface being not substantially greater than the radial width of said oil passage at the level of the upper end of said first named wall, and cooling means disposed in said well radially outside of said first named wall.

In testimony whereof, the signature of the inventor is affixed hereto.

WILLIAM MONROE WHITE.